(12) United States Patent
Sato et al.

(10) Patent No.: US 10,527,992 B2
(45) Date of Patent: Jan. 7, 2020

(54) IMAGE FORMING APPARATUS AND NON-TRANSITORY RECORDING MEDIUM STORING REPLACEMENT TIME MANAGEMENT PROGRAM

(71) Applicant: KYOCERA Document Solutions Inc., Osaka-shi, Osaka (JP)

(72) Inventors: Yasuhide Sato, Osaka (JP); Yoshihiko Arai, Osaka (JP); Yuri Moritani, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 897 days.

(21) Appl. No.: 15/164,745

(22) Filed: May 25, 2016

(65) Prior Publication Data

US 2016/0350661 A1 Dec. 1, 2016

(30) Foreign Application Priority Data

May 28, 2015 (JP) .................................. 2015-108303

(51) Int. Cl.
*G03G 15/00* (2006.01)
*G06Q 10/00* (2012.01)
(Continued)

(52) U.S. Cl.
CPC ....... *G03G 15/5079* (2013.01); *G03G 15/556* (2013.01); *G06F 3/1219* (2013.01); *G06Q 10/087* (2013.01)

(58) Field of Classification Search
CPC ............. G03G 15/5079; G03G 15/556; G03G 15/553; G06F 3/1219; G06K 15/407; G06Q 10/087; G06Q 10/20
(Continued)

(56) References Cited

U.S. PATENT DOCUMENTS 8,543,015 B2 * 9/2013 Tokuno ............. G03G 15/5079
399/12
2002/0172520 A1 * 11/2002 Suyehira ............. G06Q 10/087
399/24

(Continued)

FOREIGN PATENT DOCUMENTS

JP 08328434 A * 12/1996
JP 2001222145 A 8/2001
(Continued)

*Primary Examiner* — Robert B Beatty
(74) *Attorney, Agent, or Firm* — Alleman Hall Creasman & Tuttle LLP (57) ABSTRACT

An image forming apparatus includes a replacement time predicting circuit, a variation determining circuit, and a replacement time adjusting circuit. The replacement time predicting circuit periodically predicts, based on a consumption trend, a replacement time of a consumption article starting from a time when a replacement article is ordered, the replacement time being a time when a non-consumption amount of the consumption article is equal to or less than a specific replacement threshold. The variation determining circuit determines a variation of each later-predicted replacement time from a replacement time that is predicted when the replacement article is ordered, each later-predicted replacement time being predicted after the replacement article is ordered. The replacement time adjusting circuit, in response to the variation determined by the variation determining circuit, changes the consumption trend of the consumption article so as to reduce or eliminate the variation.

6 Claims, 5 Drawing Sheets

(51) Int. Cl.
*G06F 3/00* (2006.01)
*G06Q 10/08* (2012.01)
*G06F 3/12* (2006.01)

(58) Field of Classification Search
USPC .............................................. 399/11, 27, 79
See application file for complete search history.

(56) References Cited

U.S. PATENT DOCUMENTS

| | | | |
|---|---|---|---|
| 2006/0228123 A1 | 10/2006 | Zaima | |
| 2015/0019386 A1* | 1/2015 | Kimura | G03G 15/556 |
| | | | 705/26.81 |
| 2016/0275530 A1* | 9/2016 | Concannon | G06Q 10/087 |
| 2016/0292772 A1* | 10/2016 | Nagasaki | G06Q 30/0633 |

FOREIGN PATENT DOCUMENTS

| | | | |
|---|---|---|---|
| JP | 2001228760 A | * | 8/2001 |
| JP | 2006292830 A | | 10/2006 |
| JP | 2013029657 A | | 2/2013 |

\* cited by examiner

IMAGE FORMING APPARATUS AND NON-TRANSITORY RECORDING MEDIUM STORING REPLACEMENT TIME MANAGEMENT PROGRAM

INCORPORATION BY REFERENCE

This application is based upon and claims the benefit of priority from the corresponding Japanese Patent Application No. 2015-108303 filed on May 28, 2015, the entire contents of which are incorporated herein by reference.

BACKGROUND

The present disclosure relates to an image forming apparatus and a replacement time management program that can predict a replacement time of a cartridge storing a color material such as toner or ink.

In a typical image forming apparatus, it is general that an image formation such as printing is performed by consuming a color material such as toner or ink in a cartridge that is a consumption article, a replacement cartridge is ordered before the color material is completely consumed, and at a replacement time when the color material is completely consumed, the cartridge is replaced with the replacement cartridge.

The replacement cartridge is ordered automatically or upon receiving an ordering request from the user when, for example, the amount of color material becomes equal to or less than a predetermined amount. Here, the cartridge can be efficiently replaced if the replacement cartridge is ordered so that it is delivered on the replacement time of the cartridge. As a result, for the efficient replacement of the cartridge, it is important to predict, when the replacement cartridge is ordered, the replacement time of the cartridge.

As a related art, there is known a technology that enables a replacement time of a toner cartridge to come at a replacement date specified by the user.

In the related art, a toner consumption trend such as an average toner consumption amount per day is adjusted by changing the toner consumption restriction rate such that the toner is completely consumed on the replacement date.

With the above-described configuration, a replacement time of a toner cartridge comes at a replacement date specified by the user. This makes it possible to predict the replacement time of the toner cartridge.

According to the related art, however, the toner consumption restriction rate is changed only when the remaining amount of toner has become equal to or less than a predetermined amount. As a result, although it is possible to predict a replacement time of a toner cartridge when the replacement toner cartridge is ordered, it is impossible to respond to a variation of the toner consumption trend that occurs after the ordering.

For example, if the toner consumption amount increases after the ordering of the replacement toner cartridge, the toner may be completely consumed before the specified replacement date, namely, the predicted replacement time of the toner cartridge.

Conversely, if the toner consumption amount decreases after the ordering of the replacement toner cartridge, the toner consumption restriction rate that was set at the time of ordering is applied, and the toner consumption is unnecessarily restricted although the toner may be used until the specified date even if the toner consumption restriction rate is changed to zero (even if the toner consumption is not restricted). Such a phenomenon occurs when a consumption article is replaced with a replacement article in a typical image forming apparatus.

SUMMARY

An image forming apparatus according to an aspect of the present disclosure includes a replacement time predicting circuit, a variation determining circuit, and a replacement time adjusting circuit. The replacement time predicting circuit is that periodically predicts, based on a consumption trend, a replacement time of a consumption article starting from a time when a replacement article is ordered, the replacement time being a time when a non-consumption amount of the consumption article is equal to or less than a specific replacement threshold. The variation determining circuit that determines a variation of each later-predicted replacement time from a replacement time that is predicted when the replacement article is ordered, each later-predicted replacement time being predicted after the replacement article is ordered. The replacement time adjusting circuit that changes, in response to the variation determined by the variation determining circuit, the consumption trend of the consumption article so as to reduce or eliminate the variation.

A recording medium according to another aspect of the present disclosure is a non-transitory computer-readable recording medium storing a replacement time management program which causes a computer to execute: periodically predicting, based on a consumption trend, a replacement time of a consumption article starting from a time when a replacement article is ordered, the replacement time being a time when a non-consumption amount of the consumption article is equal to or less than a specific replacement threshold; determining a variation of each later-predicted replacement time from a replacement time that is predicted when the replacement article is ordered, each later-predicted replacement time being predicted after the replacement article is ordered; and changing, in response to the determined variation, the consumption trend of the consumption article so as to reduce or eliminate the variation.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

According to an image forming apparatus and a transitory recording medium storing a replacement time management program of the present disclosure, it is possible to respond to a variation of a consumption trend of a consumption article that occurs after a replacement article is ordered, and thereby it is possible to make the actual replacement time of the consumption article close to a replacement time predicted at the time of ordering in a reliable manner. As one example, the replacement time of the consumption article is periodically predicted starting from the time of ordering the replacement article, and the consumption trend of the consumption article is changed in response to a variation of a later-predicted replacement time from the replacement time that is predicted when the replacement article is ordered, and the variation of the replacement time is reduced or eliminated.

[Image Forming Apparatus]

Figure 1:
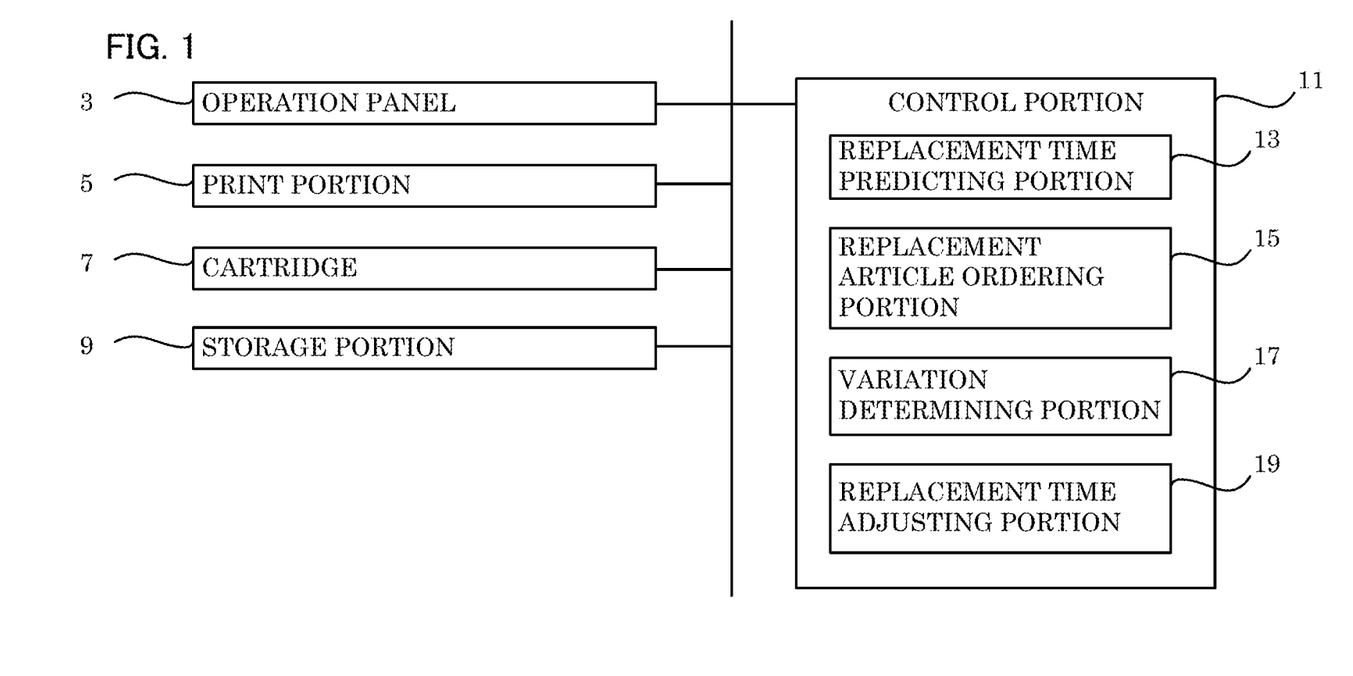
FIG. 1 is a diagram showing an image forming apparatus according to an embodiment of the present disclosure.

FIG. 1 is a diagram showing an image forming apparatus according to an embodiment of the present disclosure.

An image forming apparatus 1 is, for example, a digital multifunction peripheral, and has various functions such as a print function, a copy function, a facsimile function, and an electronic mail transmission function. The image forming apparatus 1 of the present embodiment includes an operation panel 3, a print portion 5, a cartridge 7 as a consumption article, a storage portion 9, and a control portion 11. It is noted that the above-mentioned functions can be realized by a well-known configuration, and thus detailed description thereof is omitted The operation panel 3 is an operation/display device having a touch-panel-type screen and hard keys, and realizes an operation input for the image forming apparatus 1 and displays an operation status.

The print portion 5, in the print function, the copy function, and the facsimile function, forms an image on a paper sheet by consuming color materials such as toner and ink based on the electrophotography or the ink jet method.

When the print portion 5 of the present embodiment forms an image, it is possible to change the consumption amount of color material by switching a mode in which the consumption amount of color material is set. Such modes include a color mode and a monochrome mode for different color settings, and a normal mode and a reduced-color-material-consumption mode that have different color-material-consumption restriction rates.

The monochrome mode consumes less amount of color material than the color mode, and the reduced-color-material-consumption mode consumes less amount of color material than the normal mode. In the normal mode, the color-material-consumption restriction rate is 0%, and in the reduced-color-material-consumption mode, the color-material-consumption restriction rate is, for example, 25%, 50%, or 75%. It is noted that a plurality of reduced-color-material-consumption modes may be provided in correspondence with a plurality of color material-consumption restriction rates. In addition, to set the consumption amount of color material, the color-material-consumption restriction rate may be set directly, instead of setting a mode.

The cartridge 7 is a replaceable container storing a color material that is to be consumed during an image formation performed by the print portion 5.

The storage portion 9 is a storage device that includes a ROM (Read-Only Memory) for storing programs and data necessary for processing, a RAM (Random Access Memory) as a work area, and a HDD (Hard Disk Drive) as an auxiliary storage device.

The control portion 11 is an arithmetic processing device that includes a CPU (Central Processing Unit) and controls the portions of the image forming apparatus 1 by executing a program. The control portion 11 of the present embodiment is a circuit that, by executing a replacement time management program stored in the storage portion 9, operates as a replacement time predicting portion 13, a replacement article ordering portion 15, a variation determining portion 17, and a replacement time adjusting portion 19. That is, the control portion 11 is an example of the replacement time predicting circuit, the replacement article ordering circuit, the variation determining circuit, and the replacement time adjusting circuit of the present disclosure. It is noted that in the present embodiment, the "circuit" may be an electronic component or an electronic substrate, such as a processor (such as a CPU) or an ASIC (Application-Specific Integrated Circuit), in which a plurality of electronic elements are connected by wiring. The "circuit" may further read and execute various types of programs, or execute various types of programs that are built therein in advance. In the embodiment of the present disclosure, the replacement time management program is recorded on a non-transitory computer-readable recording medium such as a CD or a DVD, and is stored in the storage portion 9 from the recording medium.

The replacement time predicting portion 13 realizes a replacement time predicting function, and predicts the replacement time of the cartridge 7 based on the remaining amount (non-consumption amount) and the consumption trend of color material. The replacement time of the cartridge 7 is a time when the cartridge 7 needs to be replaced, and is, for example, when the remaining amount of a color material in the cartridge 7 is equal to or smaller than a specific replacement threshold, such as when the remaining amount of the color material is zero.

The remaining amount of color material may be detected by a sensor or calculated from the consumption amount of color material based on the printed dots. The consumption trend of color material may be calculated from, for example, the consumption amount and consumption period of the color material, and may be, for example, a consumption amount of the color material per unit time in the image forming apparatus 1. It is noted that the consumption trend of color material may be calculated on the assumption that the color material is consumed constantly, for example, in the normal mode. In addition, it suffices that the consumption trend of color material only makes it possible to calculate the replacement time from the remaing amount of color material.

The replacement time predicting portion 13 of the present embodiment periodically predicts the replacement time of the cartridge 7 starting from the time when a replacement cartridge is ordered, which is described below. The periodic prediction is performed in time cycles such that the prediction of the replacement time is performed a plurality of times until the replacement time predicted when ordering the replacement cartridge comes.

The replacement article ordering portion 15 realizes a replacement article ordering function by which a replacement cartridge is ordered automatically or upon receiving an ordering request from the user, when the period to the replacement time of the cartridge 7 predicted by the replacement time predicting portion 13 is equal to or less than a specific ordering threshold. It is noted that the ordering of the replacement cartridge is performed via a network or the like. In addition, the ordering request from the user can be received on the operation panel 3.

The replacement article ordering portion 15 may cause the replacement time predicting portion 13 to start a periodic prediction of a replacement time of the cartridge 7 for the sake of ordering a replacement cartridge, when the time for ordering a replacement cartridge is approaching, namely, for example, when the remaining amount of color material has become equal to or smaller than a specific remaining amount threshold.

The variation determining portion 17 realizes a variation determining function, and determines a variation of each later-predicted replacement time from the replacement time that is predicted when a replacement cartridge is ordered.

The variation determining portion 17 periodically detects the remaining amount of color material in the cartridge 7, and stores the detected remaining amount in the storage portion 9 in association with a time elapsed from the attachment of the cartridge 7. The variation determining portion 17 determines the consumption trend of the color material based on the relationship between the remaining amount of color material and the elapse time. Here, the cycle at which the variation determining portion 17 detects the remaining amount of color material may be the same as the cycle at which the replacement time predicting portion 13 predicts the replacement time of the cartridge 7.

Figure 2:
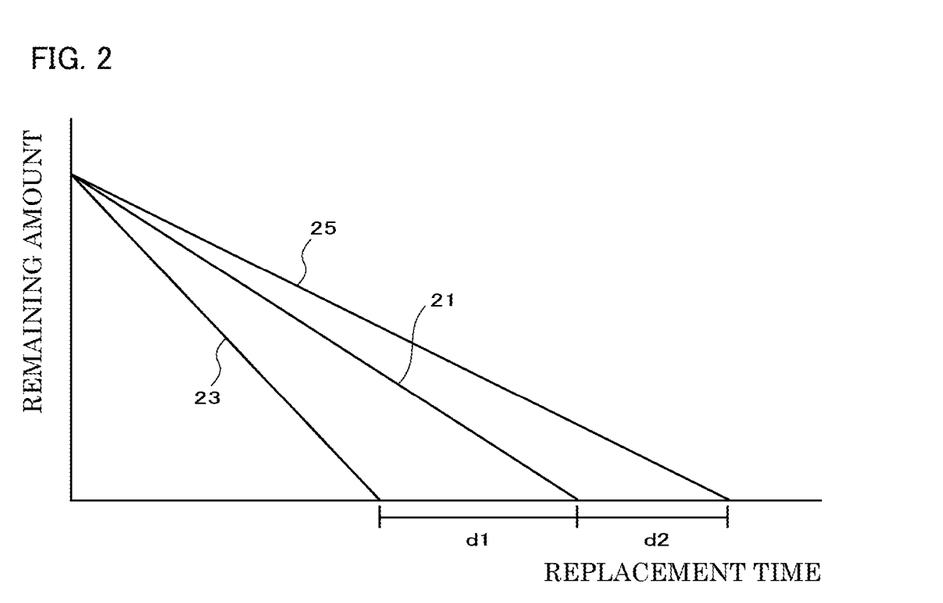
FIG. 2 is a diagram showing variations of a replacement time.

FIG. 2 is a diagram showing variations of the replacement time. The vertical axis of FIG. 2 represents the remaining amount of color material in the cartridge 7, the horizontal axis represents the replacement time when the color material in the cartridge 7 is consumed, and the line segments represent consumption trends of the color material, for example, in the mormal mode.

A line segment 21 represents a consumption trend that is detected at the time when a replacement cartridge is ordered, and line segments 23 and 25 represent consumption trends that correspond to variations of the later-predicted replacement times. For example, if the consumption amount of color material increases or decreases after an ordering of a replacement cartridge, the line segment 21 changes its inclination in correspondence with the change of the consumption trend and becomes the line segment 23 or the line segment 25, and the predicted replacement time becomes earlier or later than the replacement time that is predicted at the time of ordering. The variations of the replacement time are determined by the variation determining portion 17 as variations d1 and d2 of the later-predicted replacement times.

The replacement time adjusting portion 19 realizes a replacement time adjusting function, and in response to the variation determined by the variation determining portion 17, changes the setting of the consumption amount of color material so as to reduce or eliminate the variation of the replacement time, wherein the setting of the consumption amount of color material can be used to adjust the consumption trend. As one example, the replacement time adjusting portion 19 can change the setting of the consumption amount of color material if a line segment representing the consumption trend is separate from the line segment 21 at a specific rate (for example, a rate in a range from 5% to 30%).

In the present embodiment, the color mode, the monochrome mode, the normal mode, or the reduced-color-material-consumption mode is selected to change the setting of the consumption amount of color material. At this time, it is preferable to eliminate the variation of the replacement time completely. However, when it is impossible to do so, a mode is selected such that the replacement time after the adjustment of the consumption trend of color material is later than and closest to the replacement time that is predicted at the time of ordering. There may be a case where, even if the reduced-color-material-consumption mode is selected, the replacement time after the adjustment of the consumption trend of color material is earlier than the replacement time that is predicted at the time of ordering. In that case, the replacement time adjusting portion 19 may power off until it becomes possible that the replacement time after the adjustment of the consumption trend of color material is the same as, or later by a specific period (for example, one to three days) than the replacement time that is predicted at the time of ordering.

Figure 3:
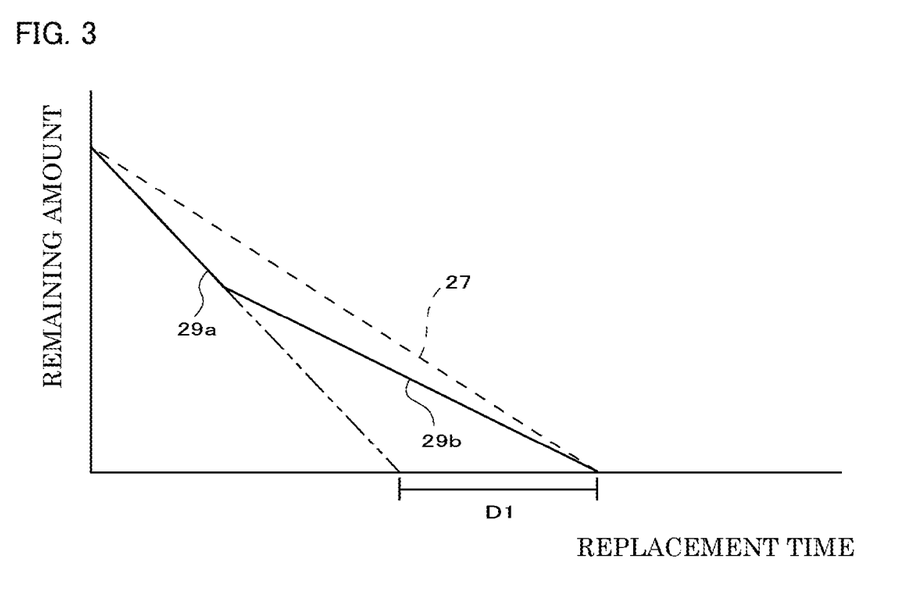
FIG. 3 is a diagram showing an adjustment of a consumption trend.

FIG. 3 is a diagram showing the adjustment of the consumption trend. As in FIG. 2, the vertical axis of FIG. 3 represents the remaining amount of color material in the cartridge 7, the horizontal axis represents the replacement time, and the line segments represent consumption trends of the color material before and after the adjustment.

A line segment 27 represents a consumption trend that is calculated when a replacement cartridge is ordered. A line segment 29a represents a consumption trend that corresponds to a replacement time varied from the replacement time predicted at the time of ordering. A line segment 29b represents a consumption trend that has been adjusted such that the replacement time predicted at the adjustment matches the replacement time predicted at the time of ordering.

In the example shown in FIG. 3, the consumption amount of color material increases after a replacement cartridge is ordered, and the inclination of the line segment 21 representing the consumption trend becomes larger and changes to the line segment 29a. At this point in time, there is a variation D1 with respect to the replacement time that is predicted at the time of ordering. To eliminate the variation D1, a mode is selected (the consumption amount of color material is set), and the inclination of the line segment 29a representing the consumption trend becomes smaller and changes to the line segment 29b.

[Replacement Time Management Process]

Figure 4:
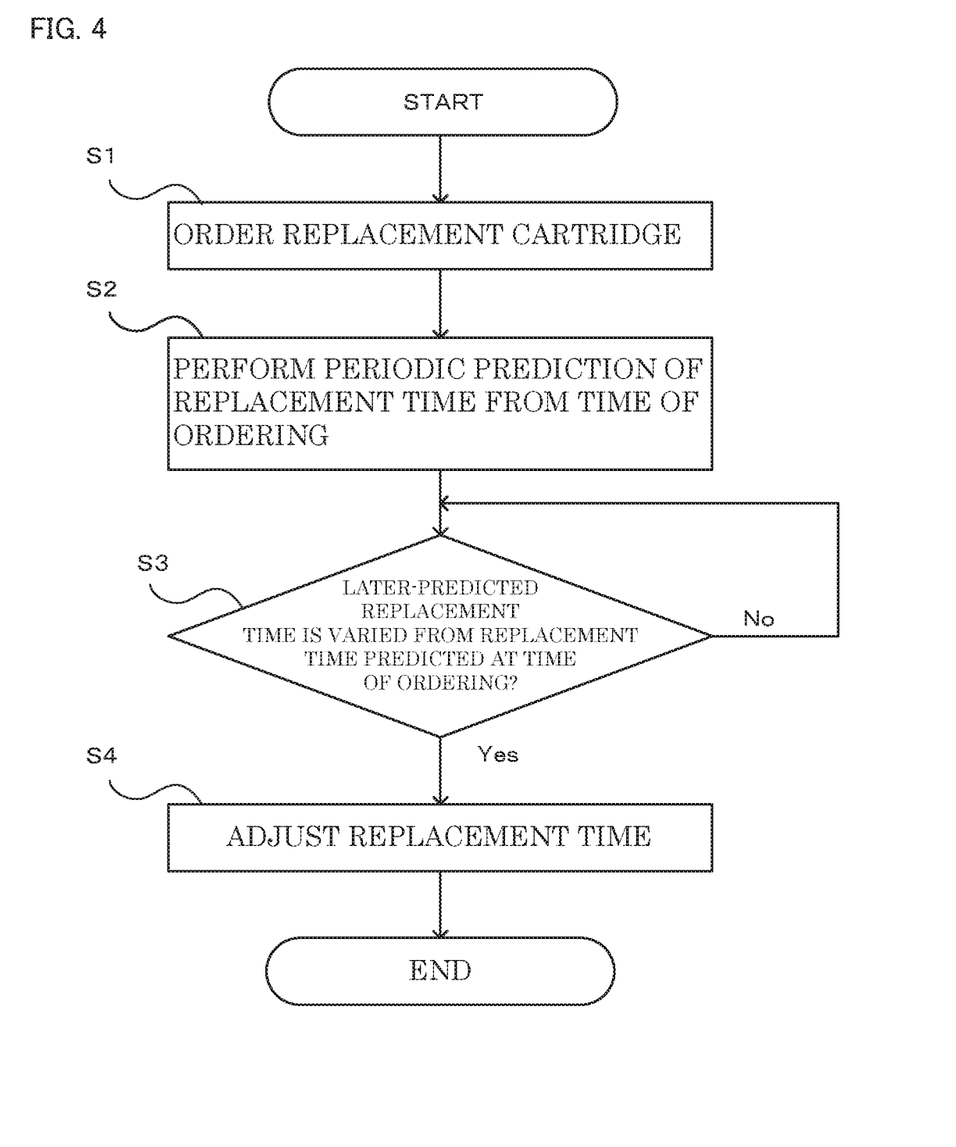
FIG. 4 shows a flow of a cartridge replacement time management process performed in the image forming apparatus shown in FIG. 1.

FIG. 4 shows a flow of a cartridge replacement time management process performed in the image forming apparatus shown in FIG. 1.

The replacement time management process is started when, for example, the time for ordering a replacement cartridge is approaching, and the process that starts from step S1 is executed.

In step S1, a replacement cartridge is ordered. That is, the replacement article ordering portion 15 causes the replacement time predicting portion 13 to start the periodic prediction of the replacement time when, for example, the remaining amount of color material has become equal to or smaller than the remaining amount threshold. Subsequently, the replacement article ordering portion 15 orders a replacement cartridge automatically or after receiving an ordering request from the user, when the time period to the predicted replacement time of the cartridge 7 is equal to or less than the ordering threshold.

The order includes the replacement time that triggered the order, and the supplier ships the replacement cartridge so that it is delivered on the replacement time included in the order.

After step S1 is completed, the process moves to step S2.

In step S2, the periodic prediction of the replacement time from the time of ordering is performed. That is, the replacement time predicting portion 13 performs the periodic prediction of the replacement time of the cartridge 7, which starts from a prediction of the replacement time that is performed when a replacement cartridge is ordered. In the present embodiment, the replacement time predicting portion 13 stores, in the storage portion 9, the replacement time that is predicted when a replacement cartridge is ordered, and then periodically predicts the replacement time of the cartridge 7 (calculates later-predicted replacement times). The periodic prediction of the replacement time can be realized by continuing the periodic prediction that has already been performed from step S1.

After step S2 is completed, the process moves to step S3.

In step S3, it is determined whether or not a later-predicted replacement time is varied from the replacement time predicted at the time of ordering. That is, the variation determining portion 17 determines whether or not the later-predicted replacement time that is periodically predicted in step 2, is varied from the replacement time predicted at the time of ordering, as shown in FIG. 2 or FIG. 3.

When the later-predicted replacement time is varied from the replacement time predicted at the time of ordering (YES), the process moves to step S4. On the other hand, when the later-predicted replacement time is not varied from the replacement time predicted at the time of ordering (NO), the process of step S3 is repeated to determine whether or not the next later-predicted replacement time is varied from the replacement time predicted at the time of ordering.

In step S4, the replacement time is adjusted. That is, the replacement time adjusting portion 19 adjusts the consumption trend of color material as indicated by, for example, the line segment 29b of FIG. 3 by changing the setting of the consumption amount of color material by selecting the monochrome mode, the color mode, the normal mode, or the reduced-color-material-consumption mode so as to reduce or eliminate the variation of each replacement time determined in step S3.

As described above, the replacement time that is varied from the replacement time predicted at the time when a replacement cartridge is ordered can be adjusted to match the replacement time that is predicted at the time of ordering, and the color material in the cartridge 7 can be completely consumed on the replacement time that is predicted at the time of ordering.

The above-described configuration prevents the color material of the cartridge 7 from being completely consumed before a replacement cartridge is delivered on the replacement time that is predicted at the time of ordering, and prevents the cartridge 7 from being replaced with a replacement cartridge in the state where a certain amount of color material remains therein, thereby preventing the color material from being wasted.

It is noted that FIG. 3 shows that after the inclination of a line segment representing the consumption trend becomes larger as indicated by the line segment 29a, the mode is changed so that the inclination of the line segment representing the consumption trend becomes smaller as indicated by the line segment 29b. However, according to the present embodiment, after the inclination of a line segment representing the consumption trend becomes smaller, the mode may be changed to make the inclination larger.

In addition, in the example of FIG. 3, the consumption trend is adjusted once by changing the mode once. However, the consumption trend may be adjusted a plurality of times by changing the mode a plurality of times.

Figure 5:
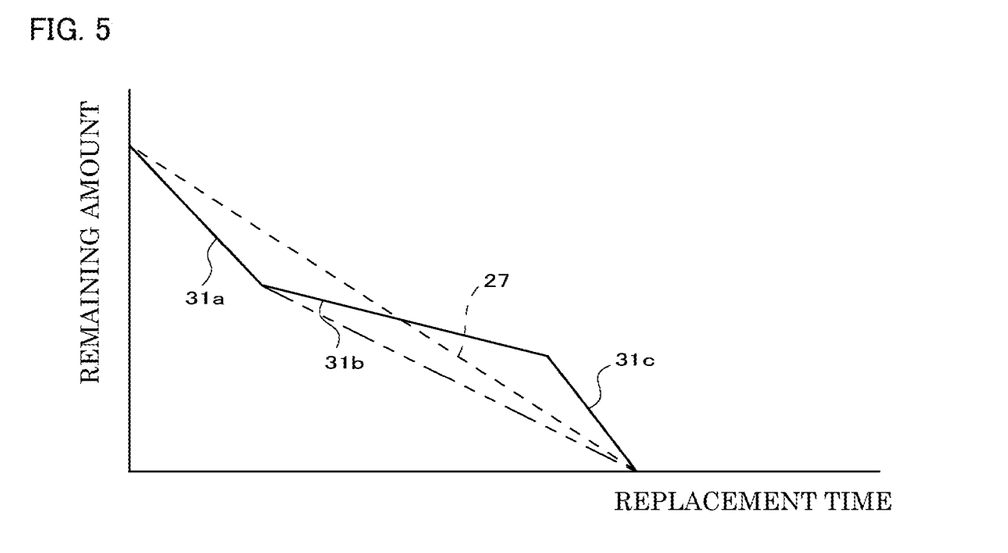
FIG. 5 is a diagram showing a plurality of adjustments of the consumption trend.

FIG. 5 is a diagram showing a plurality of adjustments of the consumption trend. As in FIG. 3, the vertical axis of FIG. 5 represents the remaining amount of color material in the cartridge 7, the horizontal axis represents the replacement time, and the line segments represent consumption trends of the color material before and after the adjustments.

In the example shown in FIG. 5, after the inclination of a line segment representing the consumption trend becomes larger as indicated by the line segment 31a, the mode (the setting of the consumption amount of color material) is changed to make the inclination smaller as indicated by the line segment 31b, as is the case with the line segments 29a and 29b of FIG. 3. It is noted that as indicated by the two-dot chain line, the replacement time which is predicted at the time of decreasing the consumption trend, matches the replacement time that is predicted at the time of ordering.

However, as indicated by the line segment 31b, by the periodic prediction of the replacement time performed thereafter, it is detected that the inclination of a line segment representing the consumption trend has become smaller than predicted as indicated by the two-dot chain line, and the predicted replacement time is shifted from the replacement time that is predicted at the time of ordering.

On the other hand, in the example of FIG. 5, as indicated by the line segment 31c, the inclination of the line segment representing the consumption trend is made larger such that the actual replacement time of the cartridge 7 matches the replacement time that is predicted at the time of ordering. The line segment 27 represents a consumption trend that is calculated when a replacement cartridge is ordered.

Effects of Embodiments

As described above, the image forming apparatus 1 of the present embodiment includes: the replacement time predicting portion 13 that periodically predicts, based on the remaining amount (non-consumption amount) and the consumption trend of a color material in the cartridge 7, a replacement time of the cartridge 7 starting from the time when a replacement cartridge is ordered, the cartridge 7 being a consumption article, the replacement time being a time when the remaining amount of the color material in the cartridge 7 is equal to or smaller than a specific replacement threshold; the variation determining portion 17 that determines a variation of each later-predicted replacement time from the replacement time that is predicted when the replacement cartridge is ordered, each later-predicted replacement time being predicted after the replacement cartridge is ordered; and the replacement time adjusting portion 19 that changes, in response to the determined variation, a setting of a consumption amount of the color material so as to reduce or eliminate the variation, the setting of the consumption amount of the color material being able to adjust the consumption trend.

Accordingly, the image forming apparatus 1 of the present embodiment can respond to a variation of the consumption trend of the color material that occurs after ordering a replacement cartridge, and can, in a reliable manner, make the actual replacement time close to or match a replacement time of the consumption article predicted at the time of ordering.

As a result, if an arrangement is made such that a replacement cartridge is delivered on a replacement time that is predicted when the replacement cartridge is ordered, it is possible to prevent the color material of the cartridge 7 from being completely consumed before the replacement cartridge is delivered, and prevent the cartridge 7 from being replaced with the replacement cartridge in the state where a certain amount of color material remains therein, thereby preventing the color material from being wasted.

In addition, in either case where a later-predicted replacement time becomes earlier or later than the replacement time that is predicted when the replacement cartridge is ordered, the replacement time adjusting portion 19 can change the setting of the consumption amount of the color material so as to reduce or eliminate the variation of the replacement time.

As a result, according to the present embodiment, it is possible to flexibly respond to a case where the consumption trend of the color material changes after a replacement cartridge is ordered. For example, as shown in FIG. 5, when a later-predicted replacement time becomes earlier than a replacement time that is predicted at the time of ordering, the consumption trend of the color material is decreased, and then when a later-predicted replacement time becomes later than the replacement time predicted at the time of ordering, the consumption trend of the color material is increased.

The image forming apparatus 1 of the present embodiment includes the replacement article ordering portion 15 that causes the replacement time predicting portion 13 to predict a replacement time of the cartridge 7, and orders a replacement cartridge automatically or upon receiving an ordering request from the user, when the period to the replacement time of the cartridge 7 is equal to or less than a specific ordering threshold.

As a result, according to the present embodiment, a replacement time predicted at the time of ordering becomes a replacement time that triggeres the order, and a replacement time can be periodically predicted thereafter easily and in a reliable manner.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:
a replacement time predicting circuit that periodically predicts, based on a consumption trend, a replacement time of a consumption article starting from a time when a replacement article is ordered, the replacement time being a time when a non-consumption amount of the consumption article is equal to or less than a specific replacement threshold;
a variation determining circuit that determines a variation of each later-predicted replacement time from a replacement time that is predicted when the replacement article is ordered, each later-predicted replacement time being predicted after the replacement article is ordered; and
a replacement time adjusting circuit that changes, in response to the variation determined by the variation determining circuit, the consumption trend of the consumption article so as to reduce or eliminate the variation, by selecting one of a plurality of modes that have different settings of consumption amount of the consumption article, wherein
the replacement time adjusting circuit selects, from the plurality of modes, a mode that allows the replacement time adjusting circuit to change the consumption trend to eliminate the variation in both cases where a later-predicted replacement time is detected to become earlier than the replacement time that is predicted when the replacement article is ordered, and where a later-predicted replacement time is detected to become later than the replacement time that is predicted when the replacement article is ordered, and when it is impossible to eliminate the variation, the replacement time adjusting circuit selects one of the plurality of modes such that the replacement time after a change of the consumption trend becomes later than and closest to the replacement time that is predicted when the replacement article is ordered.

2. The image forming apparatus according to claim 1 further comprising:
a replacement article ordering circuit that orders the replacement article automatically or after receiving an ordering request from a user, when a time period to the replacement time that is predicted when the replacement article is ordered is equal to or less than a specific ordering threshold.

3. The image forming apparatus according to claim 1, wherein
the consumption article is a cartridge storing a color material,
the replacement time predicting circuit predicts a replacement time of the cartridge based on a remaining amount and a consumption trend of the color material, and
the replacement time adjusting circuit changes a setting of a consumption amount of the color material so as to reduce or eliminate the variation, the setting of the consumption amount of the color material being able to adjust the consumption trend.

4. The image forming apparatus according to claim 1, wherein
in a case where, even if the mode is selected, the replacement time after a change of the consumption trend is earlier than the replacement time that is predicted when the replacement article is ordered, the replacement time adjusting circuit powers off until it becomes possible that the replacement time after the change of the consumption trend is not earlier than the replacement time that is predicted when the replacement article is ordered.

5. A non-transitory computer-readable recording medium storing a replacement time management program which causes a computer to execute:
periodically predicting, based on a consumption trend, a replacement time of a consumption article starting from a time when a replacement article is ordered, the replacement time being a time when a non-consumption amount of the consumption article is equal to or less than a specific replacement threshold;
determining a variation of each later-predicted replacement time from a replacement time that is predicted when the replacement article is ordered, each later-predicted replacement time being predicted after the replacement article is ordered; and
changing, in response to the determined variation, the consumption trend of the consumption article so as to reduce or eliminate the variation, by selecting one of a plurality of modes that have different settings of consumption amount of the consumption article, wherein
the changing selects, from the plurality of modes, a mode that allows the changing to change the consumption trend to eliminate the variation in both cases where a later-predicted replacement time is detected to become earlier than the replacement time that is predicted when the replacement article is ordered, and where a later-predicted replacement time is detected to become later than the replacement time that is predicted when the replacement article is ordered, and when it is impossible to eliminate the variation, the changing selects one of the plurality of modes such that the replacement time after a change of the consumption trend becomes later than and closest to the replacement time that is predicted when the replacement article is ordered.

6. The recording medium according to claim 5, wherein in a case where, even if the mode is selected, the replacement time after a change of the consumption trend is earlier than the replacement time that is predicted when the replacement article is ordered, the changing powers off until it becomes possible that the replacement time after the change of the consumption trend is not earlier than the replacement time that is predicted when the replacement article is ordered.

* * * * *